US012443551B2

(12) United States Patent
González et al.

(10) Patent No.: US 12,443,551 B2
(45) Date of Patent: Oct. 14, 2025

(54) ABSTRACTED INTERFACE FOR DIFFERENTLY CONFIGURED COMMUNICATION HARDWARE

(71) Applicant: The Boeing Company, Arlington, VA (US)

(72) Inventors: Javier Augusto González, Santiago de Compostela (ES); Emiliano Bartolomé, Pontevedra (ES); Enrique Casado, Madrid (ES)

(73) Assignee: The Boeing Company, Arlington, VA (US)

( * ) Notice: Subject to any disclaimer, the term of this patent is extended or adjusted under 35 U.S.C. 154(b) by 70 days.

(21) Appl. No.: 18/351,348

(22) Filed: Jul. 12, 2023

(65) Prior Publication Data

US 2025/0021503 A1   Jan. 16, 2025

(51) Int. Cl.
*G06F 13/26* (2006.01)
*B64U 10/00* (2023.01)

(52) U.S. Cl.
CPC .............. *G06F 13/26* (2013.01); *B64U 10/00* (2023.01)

(58) Field of Classification Search
None
See application file for complete search history.

(56) References Cited

U.S. PATENT DOCUMENTS

| | | | | |
|---|---|---|---|---|
| 9,125,987 | B2 * | 9/2015 | Levien | G16H 40/67 |
| 10,270,796 | B1 * | 4/2019 | Veeraswamy | H04L 63/1433 |
| 11,083,041 | B2 * | 8/2021 | Batsakes | H04W 76/40 |
| 12,014,640 | B1 * | 6/2024 | Manouchehri | H04L 63/083 |
| 2016/0353325 | A1 * | 12/2016 | Poikonen | H04W 28/088 |
| 2018/0375568 | A1 * | 12/2018 | De Rosa | G08G 5/0034 |
| 2019/0379683 | A1 * | 12/2019 | Overby | H04W 4/48 |
| 2020/0192347 | A1 * | 6/2020 | Fenwick | H02H 9/02 |
| 2021/0258769 | A1 * | 8/2021 | Kim | H04W 8/14 |
| 2022/0417865 | A1 * | 12/2022 | Venkatasubramanian | B64U 10/00 |

(Continued)

FOREIGN PATENT DOCUMENTS

CN       216819863 U     6/2022

*Primary Examiner* — Henry Tsai
*Assistant Examiner* — Christopher A Bartels
(74) *Attorney, Agent, or Firm* — Alleman Hall & Tuttle LLP (57) ABSTRACT

A computing system comprises an abstracted interface comprising a plurality of sub-interfaces differently configured from one another in terms of underlying communication hardware and software supported by the sub-interface. The abstracted interface further comprises a unified interface communicatively coupled with each of the sub-interfaces. Each sub-interface is configured to abstract away its respective underlying communication hardware and software from the unified interface. The unified interface is further configured to provide communication between the communication service and the control center. A monitoring service is configured to observe communication activity and output one or more communication parameters. A data prioritization policy is chosen based upon the one or more communication parameters. Data is selected for transmission based upon the data prioritization policy. The selected data is provided to one or more of the plurality of sub-interfaces selected based upon the data prioritization policy to thereby transmit the selected data.

20 Claims, 5 Drawing Sheets

(56) References Cited

U.S. PATENT DOCUMENTS

| | | | |
|---|---|---|---|
| 2023/0042857 A1* | 2/2023 | Nesargi | H04L 67/34 |
| 2023/0275970 A1* | 8/2023 | Nesargi | G06F 21/45 |
| | | | 709/220 |
| 2023/0308865 A1* | 9/2023 | Izumi | H04W 76/11 |
| 2023/0337089 A1* | 10/2023 | Ryu | B64U 10/00 |

* cited by examiner

FIG. 5

ABSTRACTED INTERFACE FOR DIFFERENTLY CONFIGURED COMMUNICATION HARDWARE

BACKGROUND

Safe and reliable communication, navigation and surveillance infrastructures are important considerations in enabling large-scale unmanned aerial system (UAS) operations. Selection of communication technology can have ripple effects in terms of capital expenditure and operating expenses, making it an important factor in the design of command and control (C2) communication data links in a UAS.

C2 Communication Service Providers (C2CSPs) enable remote operations and control centers to communicate with each other and/or controlled entities, such as aircraft, using digital data link technology. C2CSPs allow remote pilots to exchange information, such as flight plans, weather data, separation guidance and telemetry with the aircraft to control the flight from the ground.

A command-and-control link is one of several data link communication systems used in aviation, including automatic dependent surveillance-broadcast (ADS-B), controller-pilot data link communications (CPDLC), and aeronautical telecommunication networks (ATNs). These systems use different types of data link technology and protocols, but all aim to guarantee the safety and efficiency of operations in shared airspace. In addition, CPDLC allows pilots and controllers to communicate with each other using text messages transmitted via digital data link, rather than relying solely on voice communications over radio. This system can enable more efficient and accurate communication, reduce radio congestion, and improve safety by minimizing the risk of communication errors. CPDLC is used by many airlines and air traffic control centers around the world and is becoming increasingly common as technology advances. It is particularly useful in areas with high air traffic volume or in regions where voice communications may be limited. ATNs also facilitate various types of communication, including voice, data, and surveillance messages, to ensure efficient and safe operations.

SUMMARY

Examples are disclosed that relate to managing communication between a control center and a plurality of controlled entities. One example provides a computing system configured to manage communication between a control center and a plurality of controlled entities (ranging from different subsystems inside the same aircraft or even separated in different aircraft). The computing system comprises an abstracted interface comprising a plurality of sub-interfaces differently configured from one another in terms of underlying communication hardware and software supported by the sub-interface. Each sub-interface is configured to enable communication between the control center and one or more of the controlled entities. The abstracted interface further comprises a unified interface communicatively coupled with each of the sub-interfaces. Each sub-interface is configured to abstract away its respective underlying communication hardware and software from the unified interface. The unified interface is further configured to provide communication between the communication service and the control center. The computing system further comprises a monitoring service operatively coupled with the unified interface and configured to observe communication activity in the unified interface. The monitoring service is configured to output one or more communication parameters for the communication activity. The computing system further comprises one or more processors configured to receive, from the monitoring service, the one or more communication parameters. The one or more processors are further configured to choose a data prioritization policy based upon the one or more communication parameters. Data is selected for transmission to the controlled entities based upon the data prioritization policy. One or more of the plurality of sub-interfaces are also selected based upon the data prioritization policy. The selected data is provided to the unified interface. The computing system is further configured to use the unified interface to provide the selected data to the selected one or more sub-interfaces to thereby transmit the selected data to the controlled entities.

DETAILED DESCRIPTION

As described above, large-scale unmanned aerial system (UAS) operations depend upon safe and reliable communication, navigation and surveillance infrastructures. C2 Communication Service Providers (C2CSPs) enable control centers, such as a fleet operations center for remote piloting or supervising of autonomous vehicles or air traffic control (ATC), to communicate with each other and/or controlled entities, such as an aircraft (and its subsystems), using digital data link technology. Other data link communication systems used in aviation include automatic dependent surveillance-broadcast (ADS-B), controller-pilot data link communications (CPDLC), and aeronautical telecommunication networks (ATNs). These systems facilitate various types of communication, including voice, data, and surveillance messages, to ensure efficient and safe operations.

Some specific radio frequencies (e.g., C-band frequencies), have been reserved by regulatory bodies to provide reliable communications. In addition, 2.4 GHz and 5 GHz Wi-Fi™, cellular networks, or other data link technologies can be used for communications between one or more control center(s) and/or a plurality of controlled entities.

However, selection of a communication technology can be challenging because it has major implications in terms of capital expenditure, such as costs of developing communications infrastructure. The selected communication technology can affect operational expenditures, such as fees for using a proprietary frequency band or other communication platforms (e.g., a cellular network or a satellite network).

In addition, some communication paradigms are based on static systems. For instance, some systems are designed and developed to use one or more particular communication technologies, such as one or more specific radio frequencies, satellite networks, cellular networks, or C2 communication protocols. This can create a "lock-in effect" that inhibits adoption of new technologies or substitution of different technologies in other operational scenarios, such as accommodating different frequency bands in different countries. In addition, the technology selection can be driven by worst-case scenario parameters (e.g., accommodating a predetermined amount of data in a worst-case throughput scenario). This can lead to over-engineered, oversized, and/or overly expensive communication links.

In addition, there is a tradeoff between the amount of information and periodicity of the information sent through the C2 communication channel. As a result, available data throughput can be lower than the throughput needed to accommodate desired information with a desired periodicity.

Some design patterns and architectures utilize multiple communication links, for instance to provide redundancy. However, it can be challenging to accommodate the amount of information transmitted and/or received in real time while maximizing the use of the full capabilities of the communication technology. This information can vary over time and between different phases of an operation and current multilink approaches do not provide the capability of dynamically adapt the data feed based on operational parameters. This also makes communication challenging. These approaches can also lead to a lock-in effect, and do not adaptively select from different communication technologies and/or parameters based upon operational data.

Accordingly, examples are disclosed that relate to managing communication between a control center and a plurality of controlled entities in an environment with multiple diverse communication technologies. Briefly, an abstracted interface is provided which has multiple different sub-interfaces with different configurations. Specifically, the different sub-interfaces include, support, or are adapted for use with different underlying communication hardware and software. The abstracted interface further has a unified interface communicatively coupled with each of the sub-interfaces. Each sub-interface is configured to abstract away its respective underlying communication hardware and software from the unified interface. In this manner, the unified interface enables integration of different communication hardware and software during operation without redesigning the communication system.

A monitoring service is operatively coupled with the unified interface and configured to observe communication activity in the unified interface. The monitoring service is configured to output one or more communication parameters in response to the observed communication activity. A data prioritization policy is chosen based upon the communication parameters. Data is selected for transmission to the controlled entities based upon the data prioritization policy. One or more of the plurality of sub-interfaces are also selected based upon the data prioritization policy. In this manner, the different communication hardware and software can be used dynamically to shape the generated data feed to the available bandwidth, data throughput, modulation, security, speed, and/or other communication parameters as described in more detail below.

Figure 1:
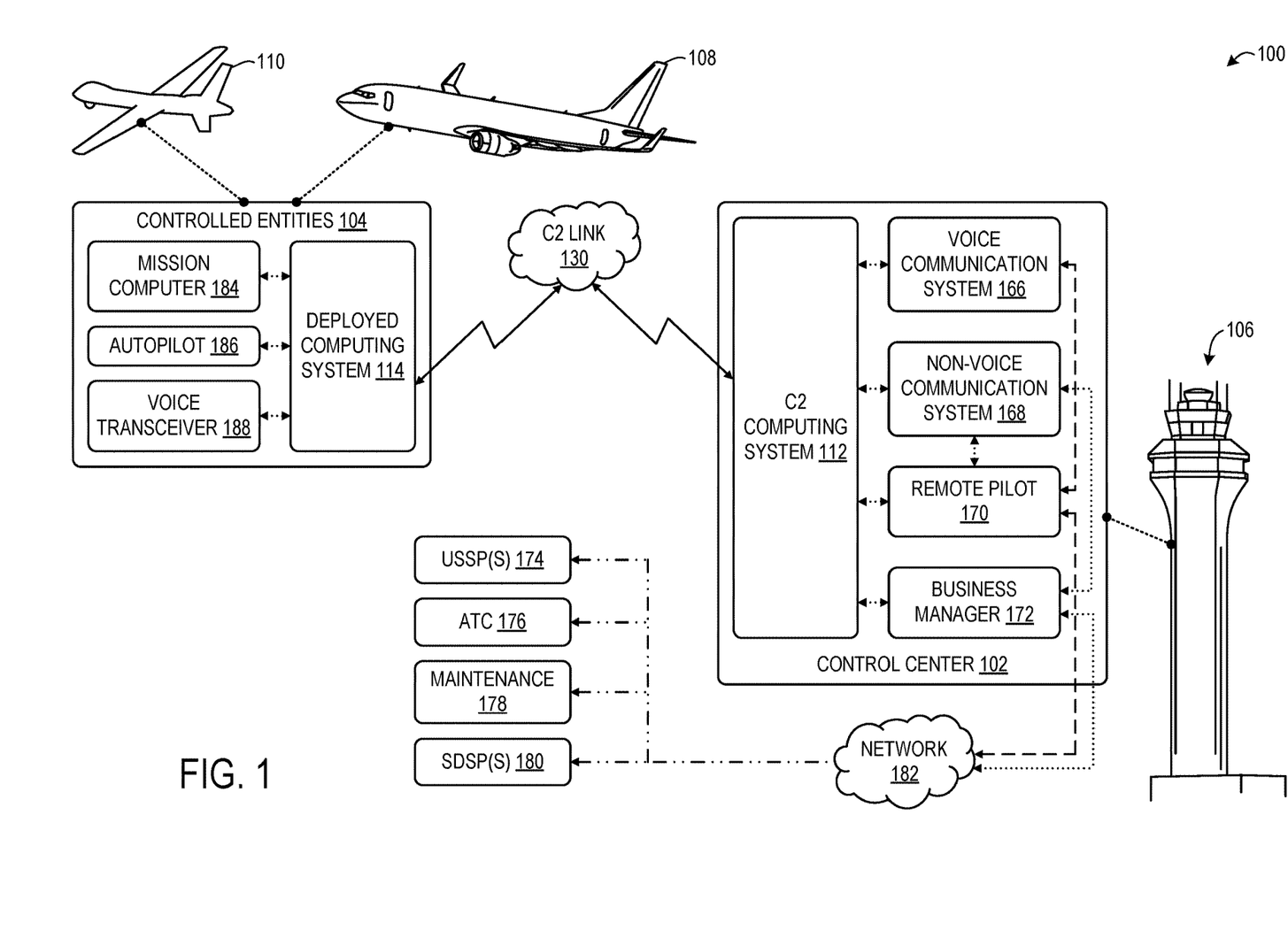
FIG. 1 shows an example of a system including a control center and a plurality of controlled entities.

FIG. 1 shows an example of a system 100 including a control center 102 and a plurality of controlled entities 104. In some examples, the control center 102 takes the form of an aviation control center 106, such as an ATC tower. In other examples, the control center 102 can be any other suitable type of control center, such as a fleet operations center for remote piloting or supervising autonomous vehicles, a military command center, an emergency response communication center, or a dispatch center for a fleet of controlled entities.

In some examples, the controlled entities 104 are aviation entities, such as a manned aircraft 108 (e.g., a passenger aircraft or a cargo aircraft) an unmanned aerial vehicle (UAV) 110 (e.g., a drone), or different sub-entities in the same aircraft (e.g., distinct aircraft subsystems). In yet other examples, the controlled entities 104 can be any other suitable type of vehicle or mode of transport, such as a spacecraft, a sea craft or watercraft for above water and/or underwater usage, or a ground- or rail-based vehicle.

The system 100 further includes a C2 computing system 112 configured to manage communication between the control center 102 and the controlled entities 104. While the following description refers to a C2 computing system 112 located at or within the control center 102, it will also be appreciated by those of ordinary skill in the art, without undue experimentation, that in accordance with the methods and systems disclosed herein, the C2 computing system can be additionally or alternatively implemented in a deployed computing system 114 located at one or more of the plurality of the controlled entities 104. In this manner, adaptive communication management can be implemented at the control center 102, at each of the controlled entities 104, at one or more controlled entities 104 that serve as a deployed communication hub for other controlled entities, or a combination thereof.

Figure 2:
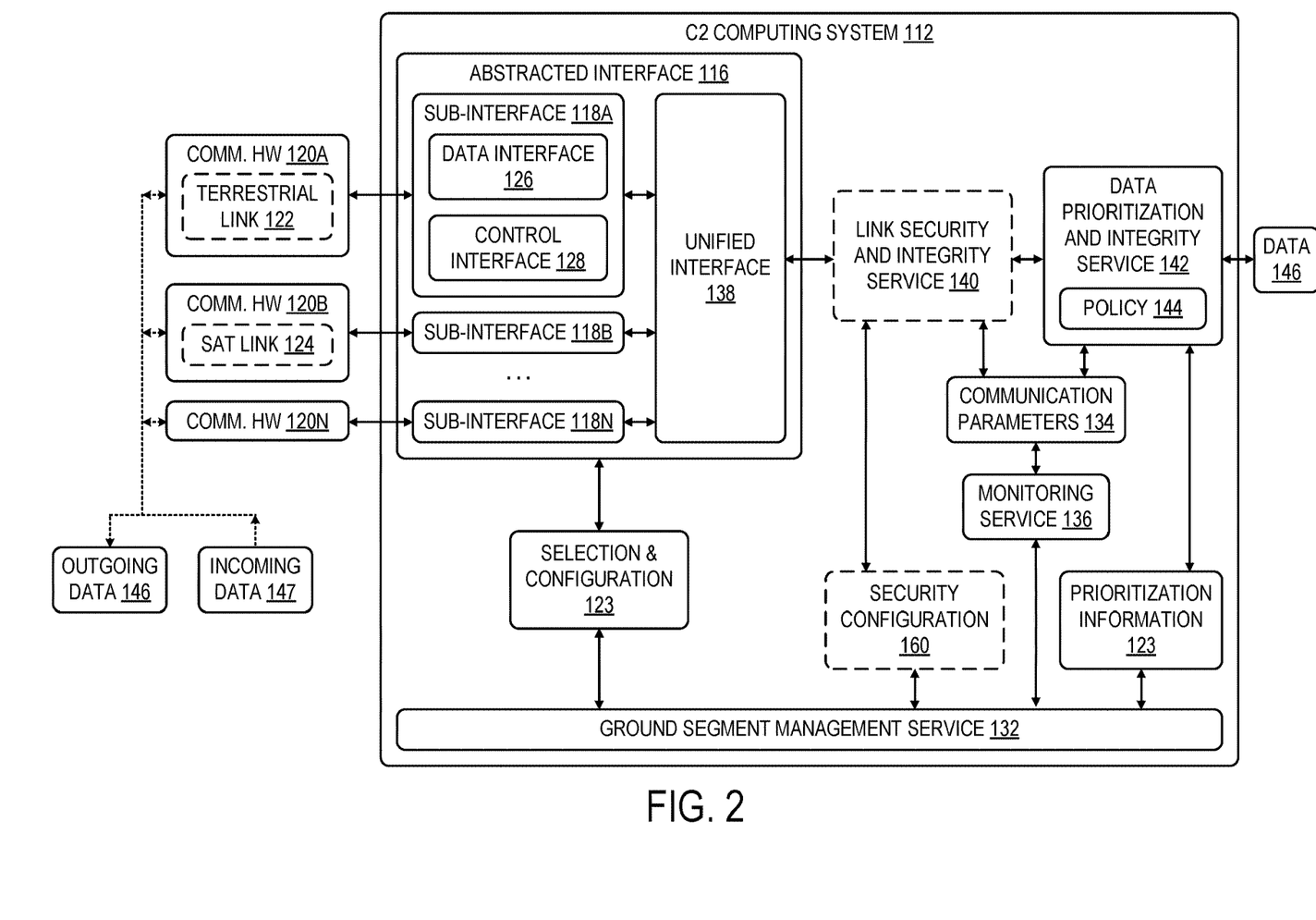
FIG. 2 shows an example of a computing system for managing communication between the control center and the plurality of the controlled entities of FIG. 1.

FIG. 2 shows additional details of the C2 computing system 112. The C2 computing system 112 has an abstracted interface 116 including a plurality of sub-interfaces 118A-118N. It is understood by those of ordinary skill in the art, without undue experimentation, that the number of sub-interfaces 118 can vary from what is shown in FIG. 2, so as to be lower in number or higher in number. Each sub-interface is configured to enable communication between the control center 102 and one or more of the controlled entities 104.

The sub-interfaces 118A-118N are differently configured from one another in terms of underlying communication hardware and software supported by the sub-interface. For example, the plurality of sub-interfaces 118A-118N are configured to interface with different communication hardware devices 120A-120N, respectively. It is understood by those of ordinary skill in the art, without undue experimentation, that the number of hardware devices 120 can vary from what is shown in FIG. 2, so as to be lower in number or higher in number; however, the number of hardware devices is generally identical to the number of sub-interfaces 118. In some examples, the plurality of sub-interfaces 118A-118N includes a sub-interface for terrestrial controller-to-controller data link hardware 122. Some examples of terrestrial communication hardware devices include telephone hardware, cellular network hardware, a terrestrial radio transceiver (e.g., a very high frequency (VHF) aeronautical communication band transceiver), and a fiber-optic transceiver. In other examples, any other suitable communication hardware or software can be used. For example, the plurality of sub-interfaces 118A-118N can additionally or alternatively include a sub-interface for satellite controller-to-controller data link hardware 124. It will also be appreciated by those of ordinary skill in the art, without undue experimentation, that the sub-interfaces 118A-118N may differ in any other suitable manner. For example, the sub-interfaces 118A-118N may be additionally or alternatively configured to communicate on different frequencies, utilize different power or amplitude, different transmission media, different security measures or encryption protocols, different modulation schemes, different antennas, different communication protocols, and/or different packet construction.

In the example illustrated in FIG. 2, each sub-interface of the plurality of sub-interfaces 118A-118N comprises a data interface 126. The sub-interface additionally or alternatively includes a control interface 128. In some examples, the data interface 126 and the control interface 128 are libraries based on one or more drivers for a respective communication hardware device 120A-120N. Such libraries provide common primitives for the underlying communication hardware and software (e.g., the drivers). For example, the sub-interface may execute a radio reservation process in response to receiving a connection request from the control center 102. The sub-interface configures the radio to connect to a signaling station, decode a table, find and identify another channel, and reconfigure the radio to connect to the other channel. The sub-interface is configured to respond to the connection request with a confirmation or denial of a successful connection, thereby hiding the complexity of the connection process. In this manner, the sub-interface can create commands to manage sessions/reservations with a communication link (e.g., a C2CSP), establish a connection following standard operating procedures (SOPs) of the link, encapsulate and decapsulate packets, and terminate the connection according to the SOPs of the link.

The data interface 126 implements data encapsulation and is communicatively coupled with a physical data connection to the C2 computing system 112 and/or a physical data connection to the communication hardware devices 120A-120N. For example, the data interface 126 can create a virtual private network (VPN) and/or a tunnel, and send user datagram protocol (UDP) packets to a specific port associated with the respective sub-interface. In some examples, the data interface 126 additionally or alternatively splits data packets that exceed a transfer threshold of the respective communication hardware device. It will also be appreciated by those of ordinary skill in the art, without undue experimentation, that the data interface 126 can operate in any other suitable manner. For example, the data interface 126 can open a serial port to send packets over recommended standard 232 (RS-232). In this manner, the data interface 126 allows the system to interact with the respective communication hardware device, while hiding implementation aspects of underlying communication hardware and/or software from the C2 computing system 112. In addition, other aspects of the system 100 of FIG. 1 can communicate through the data interface 126 without re-implementing the data interface 126. This also allows for seamless changes in the communication hardware devices 120A-120N affecting other system elements.

The control interface 128 implements commands and procedures for connecting through a respective sub-interface. In some examples, the control interface 128 comprises a representational state transfer (RESTful) application programming interface (API). In other examples, the control interface 128 comprises any other suitable interface, such as a serial port interface.

In some examples, the control interface 128 is configured to determine availability of a C2 link 130. For example, the control interface 128 may determine if the communication hardware 120A is operative. Based upon determining that the communication hardware 120A is operative, the C2 computing system 112 can initialize a reservation or connection process.

The control interface 128 is additionally or alternatively configured to reserve a specific channel in some examples. In other examples in which the channel does not require a reservation, the control interface 128 is configured to respond with an identifier. This enables the control interface 128 to create consistency for upper layers.

In some examples, the control interface 128 additionally or alternatively configures quality of service (QOS) for the sub-interface 118A. In other examples, such as those in which the control interface 128 supports the QoS by default, the control interface 128 is configured to respond and affirm the QoS to create consistency for upper layers.

The control interface 128 additionally or alternatively implements an authentication mechanism between a C2 link ground segment module 132 and the onboard communication system in some examples. This authentication mechanism can additionally or alternatively be used for any other aspects of the computing system 112. For example, the control interface 128 can perform authentication before reservation, authentication before configuration, etc.

In some examples, the control interface 128 is configured to establish the connection between the C2 computing system 112 and one or more of the plurality of controlled entities 104. This process can create artifacts that are used by the data interface 126 to implement and create physical and logical interfaces with the communication hardware device 120A.

The control interface 128 is additionally or alternatively configured to terminate the C2 link 130 in some examples. This process can also point the data interface 126 towards artifacts to be destroyed or released to finalize the physical and logical interfaces with the C2CSPs.

In some examples, the control interface 128 is configured to obtain one or more communication parameters 134 for the respective communication hardware device. As described in more detail below, examples of communication parameters 134 include signal strength, available data rate, estimated latency, and percentage of dropped packets. The control interface 128 may be additionally or alternatively configured to obtain other information, such as a radio station identifier or satellite identifier in use by a C2CSP and its position and other operational relevant parameters. The communication parameters 134 described herein can be obtained at any suitable time, such as during initiation of the C2 link 130, termination of the C2 link 130, or transmission of a predetermined number of packets. It will also be appreciated by those of ordinary skill in the art, without undue experimentation, that one or more of the communication parameters 134 can be obtained by the control interface 128 in real time. A monitoring service 136 obtains the communication parameters 134 for all of the sub-interfaces 118A-118N, which are used to manage communication between the C2 computing system 112 and the controlled entities 104 of FIG. 1 as described in more detail below.

With continued reference to FIG. 2, the abstracted interface 116 comprises a unified interface 138. The unified interface 138 is communicatively coupled with each of the sub-interfaces 118A-118N. The unified interface 138 is further configured to provide communication between the onboard communication system and the control center 102. In this manner, the unified interface 138 abstracts away the underlying communication hardware and software for the communication hardware devices 120A-120N, such that the communication hardware devices 120A-120N are hidden behind the unified interface 138. The abstraction of the communication hardware devices 120A-120N further enables the system 100 of FIG. 1 to cope with potential data outages without compromising the basic functionalities of the C2 link 130.

The unified interface 138 is configured to manage a pool of available communication hardware devices 120A-120N, including identifying a respective sub-interface for each of the communication hardware devices 120A-120N. The unified interface 138 is further configured to dynamically load the respective sub-interface upon request.

In some examples, the unified interface 138 takes the form of a router service. For example, the unified interface 138 may be configured to execute the following functions:
Result=AuthenticateUser (UserID)
(Result, ReservationID)=AskForReservation (4DTrajectory, ARS_ID)
Result=UpdateReservation (ReservationID, 4DTrajectory, ARS_ID)
Result=DropReservation (ReservationID)
Result=EstablishConnection (ReservationID, UserID, [ARS_ID])
Result=TerminateConnection (ReservationID, UserID, [ARS_ID])

To execute calls to the data interface 126 for sending or receiving data, the unified interface 138 may execute the following functions:
Result=SendPacket (PacketBytes)
Result, PacketBytes=ReceivePacket In some examples, the calls to the data interface 126 are initiated upon request of a C2 link security and integrity service 140, as described in more detail below. It will also be appreciated by those of ordinary skill in the art, without undue experimentation, that, when a connection is not established or do not have the capability to support the expected communication through the sub-interfaces 118A-118N, all data reaching the abstracted interface 116 will be dropped, thereby avoiding possible overflows.

The unified interface 138 is further configured to release internal resources (e.g., sockets and ports) upon termination of a connection. The unified interface 138 additionally or alternatively obtains available communication parameters 134 through the execution of specific commands/functions over the control interface 128 upon request.

As introduced above, the C2 computing system 112 further comprises a monitoring service 136. The monitoring service 136 is operatively coupled with the unified interface 138. The monitoring service 136 is further configured to observe communication activity in the unified interface 138 and to output the one or more communication parameters 134 for the communication activity. As introduced above, the communication parameters 134 define the behavior of the C2 Link 130 in a specific moment of time. In some examples, the monitoring service 136 exposes a RESTful API for asynchronous retrieval of the communication parameters 134 and for time-window configurations by the ground segment management service 132.

In some examples, the communication parameters 134 include C2CSP reported parameters. These parameters can be captured directly from the C2CSP through the abstracted interface 116. Some examples of C2CSP reported parameters include signal strength (e.g., signal-to-noise ratio (SNR)), latency, speed, total number of packets lost, and percent of packets lost over total number of packets.

The communication parameters 134 additionally or alternatively include self-computed parameters. For example, the control interface 128, the monitoring service 136, and/or any other suitable aspects of the C2 computing system 112 can independently estimate one or more communication parameters 134 of the C2 Link 130. Time windows used for this estimation can be configured by the ground segment management service 132 or set by default during an initialization process. Some examples of self-computed parameters include total raw packets received (e.g., extracted by accumulating all incoming packet events at the C2 link security and integrity service 140) and total secure packets received (e.g., accumulating incoming packets output from the C2 link security and integrity service 140).

Another example of a self-computed parameter includes total-end-to-end lost packets. The total-end-to-end lost packets can be computed based on sequence numbers (e.g., contained within a packet header or footer) on reception. The total-end-to-end lost packets can be affected by possible internal routing of the C2CSP (over the data link 130) that affects the sorting of packets.

Yet another example of a self-computed parameter includes percentage of lost packets. This parameter can be computed as the total end-to-end lost packets divided by the sum of the total end-to-end lost packets and total packets received after security.

Other examples of self-computed parameters include raw latency values, mean latency values, an amount of incoming corrupted packets (e.g., computed by dividing a number of packets dropped due to poor integrity by the total raw packets received), an amount of incoming unsigned packets, queue size, queue size by data type, data throughput (e.g., total incoming packets and/or total sent packets), and a security parameter (e.g., evidence that a particular communication channel is jammed or that a particular communication hardware device is under attack).

The C2 computing system 112 further comprises a data prioritization and integrity service 142. The data prioritization and integrity service 142 is configured to receive the one or more communication parameters 134 from the monitoring service 136. The data prioritization and integrity service 142 is configured to choose a data prioritization policy 144 based upon the one or more communication and operational parameters 134. In some examples, the data prioritization policy 144 is further chosen based upon one or more operational parameters input by a user of the C2 computing system 112 (e.g., a system manager). The C2 computing system 112 can use the data prioritization policy 144 to abstract data packet creation for upper layers. Furthermore, the availability of the communication parameters 134 in real time allows the C2 computing system 112 to update or adapt the data prioritization policy 144 dynamically (e.g., after a predetermined interval or in real time). It will also be appreciated by those of ordinary skill in the art, without undue experimentation, that "choosing" the data prioritization policy may include using and enforcing a data prioritization policy that is received at the C2 computing system 112 (e.g., a user-input data prioritization policy or a data prioritization policy provided to the C2 computing system 112 from another computing system).

In some examples, the data prioritization and integrity service 142 comprises an outward-facing API that is exposed to upstream actors (e.g., upstream portions of the C2 computing system 112, other computing systems, or users) for communication link management. For example, the data prioritization and integrity service 142 may be configured to interface with a voice communication system 166, a non-voice communication system 168, a remote pilot control system 170, a business manager control system 172, one or more U-space service providers (USSPs) 174, ATC 176, maintenance 178, and/or one or more supplemental data service providers (SDSPs) 180. These entities may be internal to the control center 102, or the C2 computing system 112 can interface with one or more remote entities via network 182. At the controlled entities 104, the deployed computing system 114 can interface with a mission computer 184, an autopilot system 186, and/or a voice transceiver 188. It will also be appreciated by those of ordinary skill in the art, without undue experimentation, that the deployed computing system 114 and/or the control center 102 can manage communication with any other suitable entities.

Figure 3:
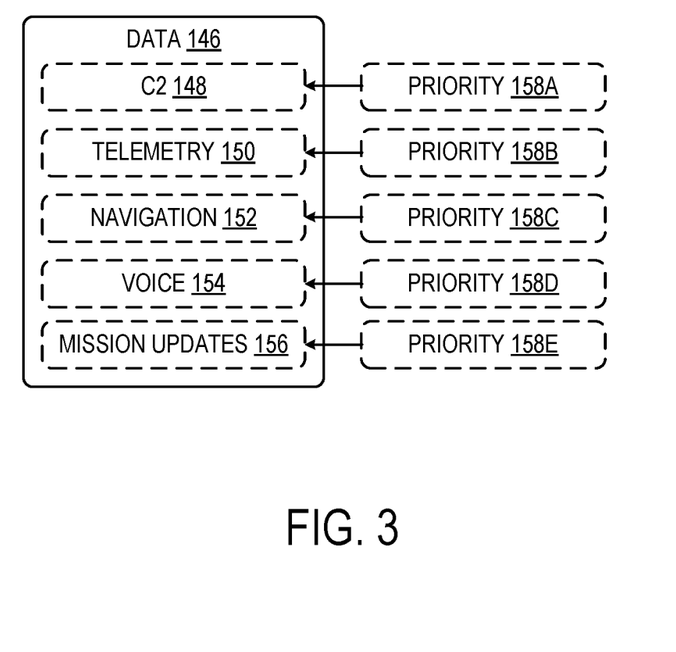
FIG. 3 shows an example of data that can be transmitted by the computing system of FIG. 2.

With reference again to FIG. 2, data 146 is selected and formatted for transmission to the controlled entities 104 based upon the data prioritization policy 144. In some examples the data prioritization policy 144 is configured to define a plurality of different data types. FIG. 3 shows additional aspects of the data 146 of FIG. 2. As illustrated in the example of FIG. 3, the data 146 includes one or more of C2 data 148, telemetry data 150, navigation data 152, voice data 154, or mission updates 158, dynamically accommodating the information according to safety and efficiency goals of the mission.

In some examples, the data prioritization policy 144 comprises instructions executable by the C2 computing system 112 to assign each data type a priority value 158A-E. It will also be appreciated by those of ordinary skill in the art, without undue experimentation, that any suitable number of priority values may be assigned. In other examples, some data types may not be assigned a priority value. In this manner, some data types may be prioritized and/or deprioritized over others.

In some examples, each new data type added to a transmission queue is considered as a lowest priority. The data prioritization and integrity service 142 can increase the priority over time to ensure that all information types are reported even in high load situations. Based upon the priority values 158A-E, the data prioritization and integrity service 142 is configured to build packets with a predefined total length but with different data types from different sources according to the data prioritization policy. The predefined total length may be configurable through the ground segment management service 132 and it can change over time according to the capabilities of the communication technology used. In this manner, the C2 computing system 112 is configured to prioritize transmission of the plurality of different data types based upon their respective priority values. For example, the C2 computing system 112 may be configured to transmit the highest priority data before the lowest priority data. If the total length of the packet is reached, the packet is sent. Data elements remaining in the queues wait until the next packet to be sent. In this way, bandwidth is allocated for the highest priority information. Furthermore, this configuration reduces the risk of sending unnecessary information (for example, sending real-time values that will be overwritten quickly when other priority information is waiting).

In other examples, the C2 computing system 112 is configured to select or remove a data type from the selected data 146 based upon the priority value. For example, the C2 computing system 112 may be configured to prioritize transmission and receipt of the voice data 154, such as ATC communications, over less-important telemetry data, such as cabin temperature telemetry data.

In some examples, the data prioritization policy 144 includes transformation algorithms for the incoming information that comprises instructions executable by the C2 computing system 112 to select all input data. With this strategy, all the data input to the data prioritization and integrity service 142 is sent over the link. An example of this type of information is a mission update or a command.

In other examples, the C2 computing system 112 is additionally or alternatively configured to select a last input value as a transformation algorithm. In this strategy, the C2 computing system 112 is configured to send the last data received in the queue, due to the temporal validity of the data. In this manner, the C2 computing system 112 can prioritize sharing the most up-to-date data for time-sensitive parameters, such as a position of an aircraft.

In yet other examples, the C2 computing system 112 is additionally or alternatively configured to select a mean value as a pre-sending transformation algorithm. In this strategy, the value included in the packet comprises a mean of values registered in the queue that have not been sent. This may be a useful strategy for parameters such as cabin temperature. After sending the data, the queue can be flushed.

In some examples, the C2 computing system 112 is additionally or alternatively configured to select a maximum value as a pre-sending transformation algorithm. In this strategy, the value included in the packet comprises the greatest value registered in the queue that has not been sent. After sending the data, the queue can be flushed.

In yet other examples, the C2 computing system 112 is additionally or alternatively configured to select a minimum value for transmission to the controlled entities as a pre-sending data transformation algorithm. In this strategy, the value included in the packet comprises the lowest value registered in the queue that has not been sent. After sending the data, the queue can be flushed.

While the data prioritization policy 144 is described above with reference to outgoing data 146, it will also be appreciated by those of ordinary skill in the art, without undue experimentation, that a similar process may be applied for incoming data 147. The C2 computing system 112 is configured to decapsulate an incoming packet and read the packet header. The packet header can be used to create an event for monitoring. Data encoded in the packet, along with an optional data type identifier, can be read and processed as described herein.

In some such examples, incoming data 147 that is received and processed is filtered based upon the data prioritization policy 144. For example, a drone with a low-bandwidth RF receiver may at least temporarily stop receiving or ignore low-priority data types, such as telemetry data 150 from another aircraft, to focus on receiving and/or processing higher-priority data types (e.g., C2 commands or separation directive data 148).

Referring again to FIG. 2, the data prioritization policy 144 is also used to select one or more of the plurality of sub-interfaces 118A-118N. For example, the data prioritization policy 144 may be configured to transmit high-priority data, such as ATC commands, using one or more of the communication hardware devices 120A-120N that are reliable (e.g., one or more of the communication hardware devices that have the fewest dropped or corrupted packets). As another example, large volumes of data (e.g., streaming video data) can be transmitted through a communication hardware device that has higher throughput, speed, and/or bandwidth (e.g., through a cellular data network) than another communication hardware device (e.g., a very low frequency (VLF) radio). In this manner, the C2 computing system 112 is configured to dynamically select and use a suitable communication link.

The C2 computing system 112 is configured to provide the selected data to the unified interface and use the unified interface as described above to provide the selected data to the selected one or more sub-interfaces to thereby transmit the selected data to the controlled entities.

In some examples, as introduced above, the C2 computing system 112 further comprises data security and integrity service 140. The data security and integrity service 140 is configured to encrypt, authenticate, validate, and/or correct incoming and outgoing data. In some examples, the data security and integrity service 140 is configured by the ground segment management service. Additional details regarding the ground segment management service 132 are described in more detail below. The ground segment management service 132 is configured to output, in possible coordination with one or more of the controlled entities 104, security configuration information 160. In some examples, the security configuration information 160 instructs the link security and integrity service 140 whether to apply one or more layers of security according to operational demands. Some examples of suitable security layers include encryption activation, definition of an encryption algorithm, activation/deactivation of a packet signature, definition of a packet signature algorithm, use of a content encryption cipher (CEC), definition of the CEC algorithm, use of forward error correction (FEC), and definition of the FEC algorithm. It will also be appreciated by those of ordinary skill in the art, without undue experimentation, that any other suitable function(s) may be incorporated into the data security and integrity service 140. Another example of a suitable function includes a scrambling service.

For a high-security treatment of an incoming packet, the data security and integrity service 140 is configured to receive the packet from the abstracted interface 116 (e.g., by using a "ReceiveData" function). It can check CEC/FEC to evaluate the integrity of the packet and potentially correct bit errors. After CEC/FEC, the signature of the packet can be checked against respective keys to ensure packet authenticity. Finally, the packet can be decrypted to obtain a plaintext packet. The plaintext packet can be forwarded to the data prioritization and integrity service 142.

For outgoing packets, the data prioritization and transfer service 142 is configured to push a new plaintext packet to the data security and integrity service 140. The data security and integrity service 140 can encrypt the plaintext packet with corresponding keys and algorithms defined by the ground segment management service 132. The data security and integrity service 140 can perform CEC/FEC to verify integrity and correct errors at the controlled entities 104. The packet is then pushed to the abstracted interface 116 (e.g., by calling a "SendData" function). In this manner, the selected data is provided to the one or more selected sub-interfaces 118A-118N to thereby transmit the selected data to the controlled entities 104 while incorporating end-to-end manageable security and integrity functions. The data security and integrity service 140 can also generate communication parameters 134 related to data security and integrity as described above.

As introduced above, the C2 computing system 112 further comprises a ground segment management service 132. The ground segment management service 132 is configured to select and configure the one or more of the plurality of sub-interfaces, as indicated at 162. The ground segment management service 132 is further configured to output data type prioritization information 164, which can be used in accordance with the data prioritization policy 144 to assign the priority values 158A-158E of FIG. 3. In some examples, the ground segment management service 132 comprises a RESTful API management interface for selection of C2 technology, reservation management, establishment/termination of connections, QoS information configuration (e.g., windows used to compute the mean and variance parameters) and retrieval, real-time information of the link retrieval to be presented to the monitoring service 136 (e.g., signal strength, ground station identifier, and position), end-to-end C2 link configuration (encryption configuration, integrity checking and error correction configuration, signature configuration, etc.) and data prioritization strategy management. In some examples, one or more business-oriented functions (e.g., a cost-optimization function for packet construction and selection of commercial communication networks) can also be implemented at the ground segment management service 132. Accordingly, the ground segment management service 132 is configured to interface with the abstracted interface 116, the link security and integrity service 140, and the data prioritization and integrity service 142 to obtain and aggregate information and to command corresponding actions. However, it will also be appreciated by those of ordinary skill in the art, without undue experimentation, that any of the functionality of the ground segment management service 132 described herein can be distributed over the abstracted interface 116, the link security and integrity service 140, and the data prioritization and integrity service 142. It will also be appreciated by those of ordinary skill in the art, without undue experimentation, that aspects of ground segment management service 132, the abstracted interface 116, the link security and integrity service 140, and/or the data prioritization and integrity service 142 can be additionally or alternatively implemented in hardware or software, and/or distributed between two or more real or virtual computing systems.

Figure 4:
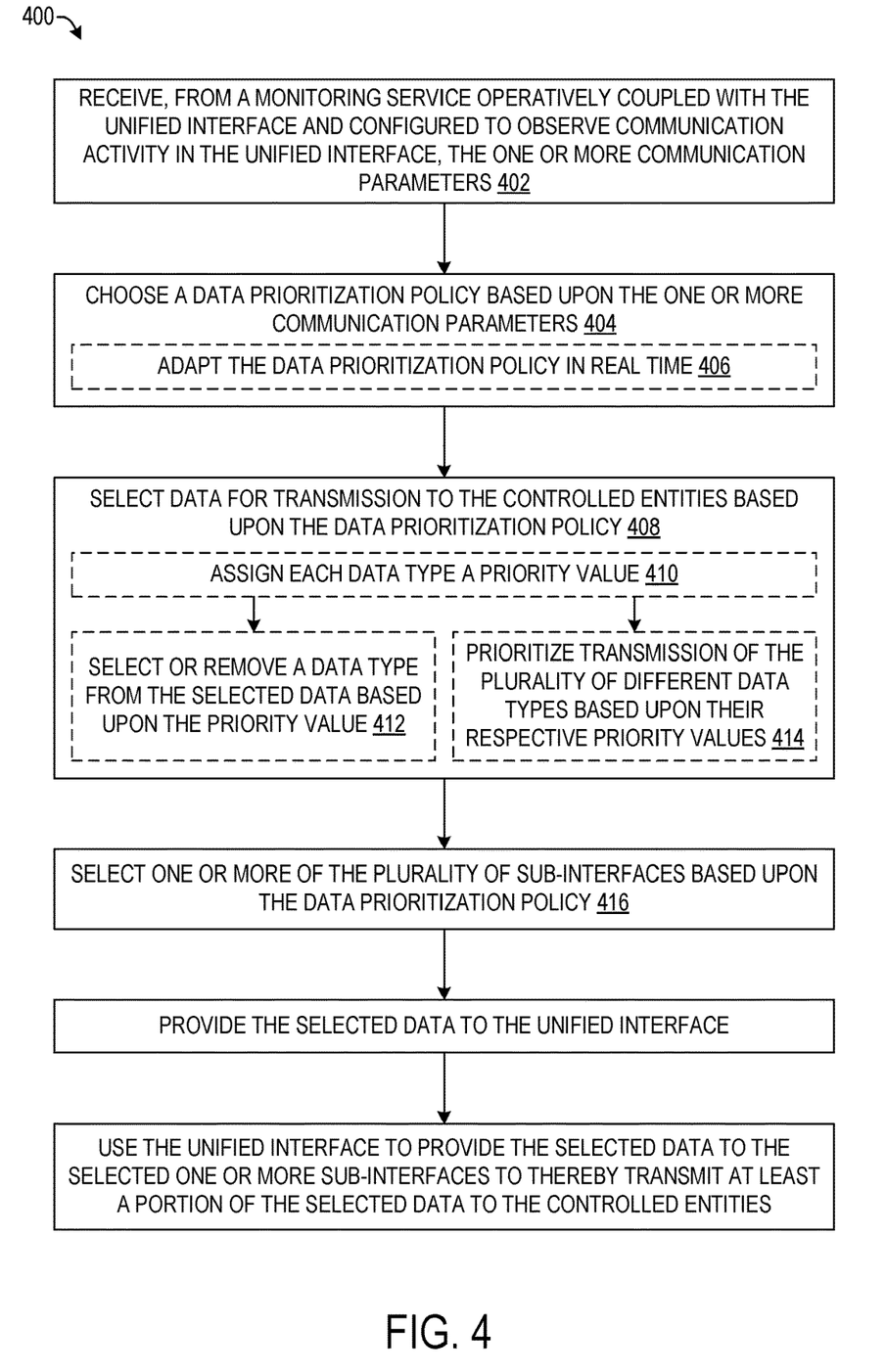
FIG. 4 shows a flow diagram of an example method for managing communication between a control center and a plurality of controlled entities.

FIG. 4 shows a flow diagram depicting an example method 400 for managing communication between a control center and a plurality of controlled entities. The following description of method 400 is provided with reference to the components described herein and shown in FIGS. 1-3 and 5. In some examples, the method 400 is performed at the C2 computing system 112 of FIGS. 1-2. In other examples, the method 400 is performed in other contexts using other suitable components.

At 402, the method 400 comprises receiving, from a monitoring service operatively coupled with a unified interface and configured to observe communication activity in the unified interface, one or more communication parameters. For example, the monitoring service 136 of FIG. 2 outputs communication parameters 134, such as a radio station identifier or satellite identifier in use by the C2CSP and its position and other operational relevant parameters.

At 404, the method 400 comprises choosing a data prioritization policy based upon the one or more communication parameters. For example, the data prioritization and integrity service 142 of FIG. 2 is configured to select and implement data prioritization policy 144.

In some examples, as indicated at 406, the method 400 comprises adapting the data prioritization policy in real time. For example, the communication parameters 134 of FIG. 2 may be output in real time. This enables the C2 computing system 112 to update or adapt the data prioritization policy 144 in real time. This enables the data prioritization policy 144 to adapt over time and/or between different phases of an operation.

At 408, the method 400 comprises selecting data for transmission to the controlled entities based upon the data prioritization policy. For example, the data prioritization and integrity service 142 of FIG. 2 is configured to select data 146 for transmission based upon the data prioritization policy 144.

In some examples, the selected data comprises a plurality of different data types. For example, the data 146 of FIG. 3 comprises C2 data 148, telemetry data 150, navigation data 152, voice data 154, and mission update data 156. At 410, the method 400 comprises assigning each data type a priority value. For example, each data type 148-156 illustrated in the example of FIG. 3 is assigned a respective priority value 158A-158E.

The method 400 further comprises, in some examples, selecting or removing a data type from the selected data based upon the priority value, as indicated at 412. For example, the C2 computing system 112 of FIG. 2 may select the voice data 154 of FIG. 3 and remove all other data types. In this manner, the C2 computing system 112 can prioritize transmission of the voice data 154, which may include ATC commands, over less-important data (e.g., the telemetry data 150 or mission updates 156).

In some examples, the method 400 additionally or alternatively includes, at 414, prioritizing transmission of the plurality of different data types based upon their respective priority values. For example, the C2 computing system 112 may be configured to transmit the highest priority data before the lowest priority data. In this way, bandwidth is allocated for the highest priority information first, before sharing less-important information.

At 416, the method 400 comprises selecting one or more of the plurality of sub-interfaces based upon the data prioritization policy. For example, the data prioritization policy 144 may be configured to transmit high-priority data, such as ATC commands, using a VHF aeronautical radio, and transmit lower-priority data, such as cabin climate control parameters, over a satellite network.

The method 400 further comprises, at 418, providing the selected data to a unified interface. For example, the C2 computing system 112 of FIG. 2 is configured to forward the data 124 to the unified interface 138. At 420, the method 400 comprises using the unified interface to provide the selected data to the selected one or more sub-interfaces to thereby transmit at least a portion of the selected data to the controlled entities. For example, the unified interface 138 of FIG. 2 may function as a routing service to direct the data 124 to the selected one or more sub-interfaces 118A-118N, which interface with the communication hardware devices 120A-120N, respectively, to transmit the data 124. In this manner, the data is transmitted to the selected entities. However, the unified interface abstracts away the underlying functionality of the sub-interfaces 118A-118N, and in turn, the communication hardware devices 120A-120N. This allows the C2 computing system 112 to interface with different communication hardware and software without being explicitly configured for a static C2CSP or communication technology.

In some embodiments, the examples described herein can be tied to a computing system of one or more computing devices. In particular, aspects of such methods and processes can be implemented as a computer-application program or service, an API, a library, and/or other computer-program product.

Figure 5:
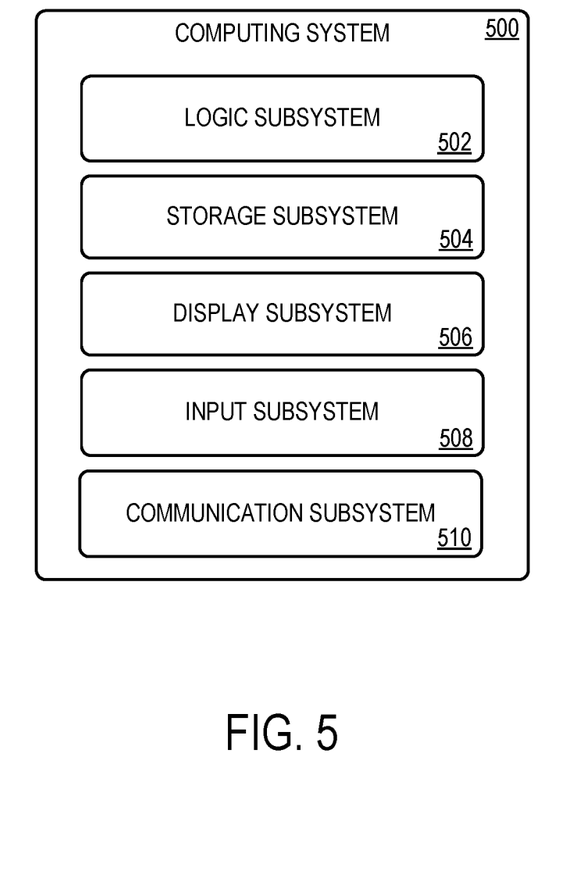
FIG. 5 is a block diagram of an example computing system.

FIG. 5 schematically shows a non-limiting embodiment of a computing system 500 that can enact one or more of the examples described above. For example, computing system 500 can be used to execute instructions to perform the method 400 of FIG. 4 and/or potentially perform other functions.

Computing system 500 is shown in simplified form. Computing system 500 can take the form of one or more personal computers, server computers, tablet computers, network computing devices, mobile computing devices, mobile communication devices (e.g., smart phones), and/or other computing devices. In some examples, the C2 computing 112 of FIG. 1 and/or the deployed computing system 114 of FIG. 1 comprise one or more aspects of the computing system 500.

Computing system 500 includes a logic subsystem 502, a storage subsystem 504, and an optional display subsystem 506. Computing system 500 can optionally include an input subsystem 508, a communication subsystem 510, and/or other computing-related components not shown in FIG. 5.

Logic subsystem 502 includes one or more physical devices configured to execute instructions. For example, logic subsystem 502 can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result. For example, logic subsystem 502 can be used to execute instructions to perform the method 400 of FIG. 4.

Logic subsystem 502 can include one or more processors configured to execute software instructions. Additionally or alternatively, logic subsystem 502 can include one or more hardware or firmware logic machines configured to execute hardware or firmware instructions. Processors of logic subsystem 502 can be single-core or multi-core, and the instructions executed thereon can be configured for sequential, parallel, and/or distributed processing. Individual components of logic subsystem 502 optionally can be distributed among two or more separate devices, which can be remotely located and/or configured for coordinated processing. Aspects of logic subsystem 502 can be virtualized and executed by remotely accessible, networked computing devices configured in a cloud-computing configuration.

Storage subsystem 504 includes one or more physical devices configured to hold instructions executable by logic subsystem 502 to implement the methods and processes described herein. For example, storage subsystem 504 can hold instructions executable to perform the method 400 of FIG. 4 and/or potentially perform other functions. When such methods and processes are implemented, the state of storage subsystem 504 can be transformed—e.g., to hold different data.

Storage subsystem 504 can include removable and/or built-in devices. Storage subsystem 504 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 504 can include volatile, nonvolatile, dynamic, static, read/write, read-only, random-access, sequential-access, location-addressable, file-addressable, and/or content-addressable devices.

It will be appreciated by those of ordinary skill in the art, without undue experimentation, that storage subsystem 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 502 and storage subsystem 504 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, a display subsystem 506 can be used to present a visual representation of data held by storage subsystem 504. This visual representation can take the form of a graphic user interface (GUI). As the herein described methods and processes change the data held by the storage subsystem 504, and thus transform the state of the storage machine, the state of display subsystem 506 can likewise be transformed to visually represent changes in the underlying data.

When included, a display subsystem 506 can include one or more display devices utilizing virtually any type of technology. Such display devices can be combined with logic subsystem 502 and/or storage subsystem 504 in a shared enclosure, or such display devices can be peripheral display devices.

When included, input subsystem 508 can comprise or interface with one or more user-input devices such as a keyboard, mouse, touch screen, or joystick. In some embodiments, the input subsystem 508 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition: an infrared, color, stereoscopic, and/or depth camera for machine vision and/or gesture recognition; a head tracker, eye tracker, accelerometer, and/or gyroscope for motion detection and/or intent recognition: as well as electric-field sensing componentry for assessing brain activity. For example, input subsystem 508 may comprise a microphone configured to receive the voice data 154.

When included, and without respect to the dynamic and reconfigurable communication system described above, the communication subsystem 510 can be configured to communicatively couple computing system 500 with one or more other computing devices. Communication subsystem 510 can include wired and/or wireless communication devices compatible with one or more different communication protocols. As non-limiting examples, the communication subsystem can be configured for communication via a wireless telephone network, or a wired or wireless local- or wide-area network. In some embodiments, communication subsystem 510 can allow computing system 500 to send and/or receive messages (e.g., the data 146) to and/or from other devices via a network such as the Internet. For example, communication subsystem 510 can be used to receive or send data to another computing system. As another example, communication subsystem may be used to communicate with other computing systems during execution of method 400 in a distributed computing environment.

Further, the disclosure comprises configurations according to the following clauses.

Clause 1. A computing system configured to manage communication between a control center and a plurality of controlled entities, the computing system comprising: an abstracted interface comprising, a plurality of sub-interfaces differently configured from one another in terms of underlying communication hardware and software supported by the sub-interface, each sub-interface being configured to enable communication between the control center and one or more of the controlled entities, and a unified interface communicatively coupled with each of the sub-interfaces, wherein each sub-interface is configured to abstract away its respective underlying communication hardware and software from the unified interface, the unified interface being further configured to provide communication between the communication service and the control center; a monitoring service operatively coupled with the unified interface and configured to observe communication activity in the unified interface, wherein the monitoring service is configured to output one or more communication parameters for the communication activity; and one or more processors configured to, receive, from the monitoring service, the one or more communication parameters, choose a data prioritization policy based upon the one or more communication parameters, select data for transmission to the controlled entities based upon the data prioritization policy, select one or more of the plurality of sub-interfaces based upon the data prioritization policy, provide the selected data to the unified interface, and use the unified interface to provide the selected data to the selected one or more sub-interfaces to thereby transmit the selected data to the controlled entities.

Clause 2. The computing system of clause 1, wherein the control center comprises an aviation control center, and wherein the plurality of controlled entities comprises a plurality of controlled aviation entities.

Clause 3. The computing system of clause 1, wherein the plurality of controlled entities comprises a plurality of unmanned aerial vehicles.

Clause 4. The computing system of clause 1, wherein each sub-interface of the plurality of sub-interfaces comprises a data interface and a control interface.

Clause 5. The computing system of clause 1, wherein the plurality of sub-interfaces includes a sub-interface for terrestrial controller-to-controller data link hardware and a sub-interface for satellite controller-to-controller data link hardware.

Clause 6. The computing system of clause 1, wherein the one or more communication parameters comprise one or more of signal strength, data throughput, latency, amount of packets lost, amount of packets corrupted, amount of incoming unsigned packets, queue size, total raw packets received, total secure packets received, total sent packets, a security parameter, or a speed parameter.

Clause 7. The computing system of clause 1, wherein the one or more processors are further configured to adapt the data prioritization policy in real time.

Clause 8. The computing system of clause 1, wherein the one or more processors are further configured to filter incoming data based upon the data prioritization policy.

Clause 9. The computing system of clause 1, wherein the data prioritization policy comprises instructions executable by the one or more processors to transform information before being sent by selecting all input data, selecting a last input value, selecting a mean value, selecting a maximum value, or selecting a minimum value for transmission to the controlled entities.

Clause 10. The computing system of clause 1, wherein the selected data comprises a plurality of different data types, and wherein the data prioritization policy comprises instructions executable by the one or more processors to assign each data type a priority value.

Clause 11. The computing system of clause 10, wherein the one or more processors are further configured to select or remove a data type from the selected data based upon the priority value.

Clause 12. The computing system of clause 10, wherein the one or more processors are further configured to prioritize transmission of the plurality of different data types based upon their respective priority values.

Clause 13. The computing system of clause 1, further comprising a data security and integrity service configured to encrypt, authenticate, validate, or correct incoming and outgoing data.

Clause 14. The computing system of clause 1, further comprising a ground segment management service, wherein the one or more processors are configured to use the ground segment management service to select and configure the one or more of the plurality of sub-interfaces, and wherein the one or more processors are further configured to receive data type prioritization information from the ground segment management service.

Clause 15. At a computing system configured to manage communication between a control center and a plurality of controlled entities, the computing system comprising an abstracted interface comprising a plurality of sub-interfaces differently configured from one another in terms of underlying communication hardware and software supported by the sub-interface, each sub-interface being configured to enable communication between the communication service and one or more of the controlled entities, and a unified interface communicatively coupled with each of the sub-interfaces, wherein each sub-interface is configured to abstract away its respective underlying communication hardware and software from the unified interface, the unified interface being further configured to provide communication between the communication service and the control center, a method comprising: receiving, from a monitoring service operatively coupled with the unified interface and configured to observe communication activity in the unified interface, the one or more communication parameters: choosing a data prioritization policy based upon the one or more communication parameters: selecting data for transmission to the controlled entities based upon the data prioritization policy: selecting one or more of the plurality of sub-interfaces based upon the data prioritization policy: providing the selected data to the unified interface; and using the unified interface to provide the selected data to the selected one or more sub-interfaces to thereby transmit at least a portion of the selected data to the controlled entities.

Clause 16. The method of clause 15, further comprising adapting the data prioritization policy in real time.

Clause 17. The method of clause 15, wherein the selected data comprises a plurality of different data types, further comprising assigning each data type a priority value.

Clause 18. The method of clause 17, further comprising selecting or removing a data type from the selected data based upon the priority value.

Clause 19. The method of clause 17, further comprising prioritizing transmission of the plurality of different data types based upon their respective priority values.

Clause 20. A computing system configured to manage communication between an aviation control center and a plurality of controlled aviation entities, the computing system comprising: an abstracted interface comprising, a plurality of sub-interfaces differently configured from one another in terms of underlying communication hardware and software supported by the sub-interface, each sub-interface being configured to enable communication between the communication service and one or more of the controlled aviation entities, and a unified interface communicatively coupled with each of the sub-interfaces, wherein each sub-interface is configured to abstract away its respective underlying communication hardware and software from the unified interface, the unified interface being further configured to provide communication between the communication service and the aviation control center: a monitoring service operatively coupled with the unified interface and configured to observe communication activity in the unified interface, wherein the monitoring service is configured to output one or more communication parameters for the communication activity; and one or more processors configured to, receive, from the monitoring service, the one or more communication parameters, choose a data prioritization policy based upon the one or more communication parameters, select data for transmission to the controlled aviation entities based upon the data prioritization policy, select one or more of the plurality of sub-interfaces based upon the data prioritization policy, provide the selected data to the unified interface, and use the unified interface to provide the selected data to the selected one or more sub-interfaces to thereby transmit the selected data to the controlled aviation entities.

This disclosure is presented by way of example and with reference to the associated drawing figures. Components, process steps, and other elements that can be substantially the same in one or more of the figures are identified coordinately and are described with minimal repetition. It will be noted, however, that elements identified coordinately can also differ to some degree. It will be further noted that some figures can be schematic and not drawn to scale. The various drawing scales, aspect ratios, and numbers of components shown in the figures can be purposely distorted to make certain features or relationships easier to see.

"And/or" as used herein is defined as the inclusive or $\vee$, as specified by the following truth table:

| A | B | A $\vee$ B |
|---|---|---|
| True | True | True |
| True | False | True |
| False | True | True |
| False | False | False |

The terminology "one or more of A or B" as used herein comprises A, B, or a combination of A and B. The terminology "one or more of A, B, or C" is equivalent to A, B, and/or C. As such, "one or more of A, B, or C" as used herein comprises A individually, B individually, C individually, a combination of A and B, a combination of A and C, a combination of B and C, or a combination of A, B and C.

It will be understood that the configurations and/or approaches described herein are exemplary in nature, and that these specific embodiments or examples are not to be considered in a limiting sense, because numerous variations are possible. The specific routines or methods described herein can represent one or more of any number of strategies. As such, various acts illustrated and/or described can be performed in the sequence illustrated and/or described, in other sequences, in parallel, or omitted. Likewise, the order of the above-described processes can be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system configured to manage communication between a control center and a plurality of controlled entities, the computing system comprising:
an abstracted interface comprising, a plurality of sub-interfaces in which each sub-interface is configured to enable communication between the control center and one or more controlled entities of the plurality of controlled entities via an associated communication hardware device, wherein each sub-interface is differently configured from each other of the plurality of sub-interfaces in terms of underlying communication hardware and software supported by the sub-interface with respect to its associated communication hardware device, such that the control center and the plurality of controlled entities communicate with one another using a different hardware communication technology for each of the plurality of sub-interfaces and its associated communication hardware device, and a unified interface communicatively coupled with each of the sub-interfaces, wherein each sub-interface is configured to abstract away its respective underlying communication hardware and software from the unified interface;

a monitoring service operatively coupled with the unified interface and configured to observe communication activity in the unified interface, wherein the monitoring service is configured to output one or more communication parameters for the communication activity; and one or more processors configured to,
- receive, from the monitoring service, the one or more communication parameters,
- choose a data prioritization policy based upon the one or more communication parameters,
- select data for transmission to the plurality of controlled entities based upon the data prioritization policy,
- select one or more of the plurality of sub-interfaces based upon the data prioritization policy,
- provide the selected data to the unified interface, and
- use the unified interface to provide the selected data to the selected one or more sub-interfaces to thereby transmit the selected data to the plurality of controlled entities remotely located from the plurality of sub-interfaces via the one or more associated communication hardware devices of the selected one or more sub-interfaces.

2. The computing system of claim 1, wherein the control center comprises an aviation control center, and wherein the plurality of controlled entities comprises a plurality of controlled aviation entities.

3. The computing system of claim 1, wherein the plurality of controlled entities comprises a plurality of unmanned aerial vehicles.

4. The computing system of claim 1, wherein each sub-interface of the plurality of sub-interfaces comprises a data interface and a control interface.

5. The computing system of claim 1, wherein the plurality of sub-interfaces includes a sub-interface for terrestrial controller-to-controller data link hardware and a sub-interface for satellite controller-to-controller data link hardware.

6. The computing system of claim 1, wherein the one or more communication parameters comprise one or more of signal strength, data throughput, latency, amount of packets lost, amount of packets corrupted, amount of incoming unsigned packets, queue size, total raw packets received, total secure packets received, total sent packets, a security parameter, or a speed parameter.

7. The computing system of claim 1, wherein the one or more processors are further configured to adapt the data prioritization policy in real time.

8. The computing system of claim 1, wherein the one or more processors are further configured to filter incoming data based upon the data prioritization policy.

9. The computing system of claim 1, wherein the data prioritization policy comprises instructions executable by the one or more processors to select a mean value of un-sent values registered in a transmission queue as a pre-sending transformation algorithm.

10. The computing system of claim 1, wherein the selected data comprises a plurality of different data types, and wherein each data type is assigned a different respective priority value of a plurality of different priority values.

11. The computing system of claim 10, wherein the one or more processors are further configured to select or remove a data type from the selected data based upon its respective priority value.

12. The computing system of claim 10, wherein the one or more processors are further configured to prioritize transmission of the plurality of different data types based upon their respective priority values.

13. The computing system of claim 1, further comprising a data security and integrity service configured to encrypt, authenticate, validate, or correct incoming and outgoing data.

14. The computing system of claim 1, further comprising a ground segment management service, wherein the one or more processors are configured to use the ground segment management service to select and configure the one or more of the plurality of sub-interfaces, and wherein the one or more processors are further configured to receive data type prioritization information from the ground segment management service.

15. At a computing system configured to manage communication between a control center and a plurality of controlled entities, the computing system comprising an abstracted interface comprising a plurality of sub-interfaces in which each sub-interface is configured to enable communication between the control center and one or more controlled entities of the plurality of controlled entities via an associated communication hardware device, wherein each sub-interface is differently configured from each other of the plurality of sub-interfaces in terms of underlying communication hardware and software supported by the sub-interface with respect to its associated communication hardware device, such that the control center and the plurality of controlled entities communicate with one another using a different hardware communication technology for each of the plurality of sub-interfaces and its associated communication hardware device, and a unified interface communicatively coupled with each of the sub-interfaces, wherein each sub-interface is configured to abstract away its respective underlying communication hardware and software from the unified interface, a method comprising:

- receiving one or more communication parameters from a monitoring service operatively coupled with the unified interface and configured to observe communication activity in the unified interface;
- choosing a data prioritization policy based upon the one or more communication parameters;
- selecting data for transmission to the plurality of controlled entities based upon the data prioritization policy;
- selecting one or more of the plurality of sub-interfaces based upon the data prioritization policy;
- providing the selected data to the unified interface; and
- using the unified interface to provide the selected data to the selected one or more sub-interfaces to thereby transmit at least a portion of the selected data to the plurality of controlled entities remotely located from the plurality of sub-interfaces via the one or more associated communication hardware devices of the selected one or more sub-interfaces.

16. The method of claim 15, further comprising adapting the data prioritization policy in real time.

17. The method of claim 15, wherein the selected data comprises a plurality of different data types, and wherein each data type is assigned a different respective priority value of a plurality of different priority values.

18. The method of claim 17, further comprising selecting or removing a data type from the selected data based upon its respective priority value.

19. The method of claim 17, further comprising prioritizing transmission of the plurality of different data types based upon their respective priority values.

20. A computing system configured to manage communication between an aviation control center and a plurality of controlled aviation entities, the computing system comprising:

an abstracted interface comprising,
a plurality of sub-interfaces in which each sub-interface is configured to enable communication between the aviation control center and one or more controlled aviation entities of the plurality of controlled aviation entities via an associated communication hardware device, wherein each sub-interface is differently configured from each other of the plurality of sub-interfaces in terms of underlying communication hardware and software supported by the sub-interface with respect to its associated communication hardware device, such that the aviation control center and the plurality of controlled aviation entities communicate with one another using a different hardware communication technology for each of the plurality of sub-interfaces and its associated communication hardware device, and
a unified interface communicatively coupled with each of the sub-interfaces, wherein each sub-interface is configured to abstract away its respective underlying communication hardware and software from the unified interface;
a monitoring service operatively coupled with the unified interface and configured to observe communication activity in the unified interface, wherein the monitoring service is configured to output one or more communication parameters for the communication activity, and the monitoring service exposes a Representational State Transfer (RESTful) application programming interface (API); and
one or more processors configured to,
receive, from the monitoring service, the one or more communication parameters, wherein the one or more communication parameters are retrieved asynchronously from the monitoring service via the RESTful API,
choose a data prioritization policy based upon the one or more communication parameters,
select data for transmission to the plurality of controlled aviation entities based upon the data prioritization policy,
select one or more of the plurality of sub-interfaces based upon the data prioritization policy,
provide the selected data to the unified interface, and
use the unified interface to provide the selected data to the selected one or more sub-interfaces to thereby transmit the selected data to the plurality of controlled aviation entities remotely located from the plurality of sub-interfaces via the one or more associated communication hardware devices of the selected one or more sub-interfaces.

* * * * *